(12) United States Patent
Wanish

(10) Patent No.: US 7,058,619 B2
(45) Date of Patent: Jun. 6, 2006

(54) METHOD, SYSTEM AND COMPUTER PROGRAM PRODUCT FOR FACILITATING DIGITAL CERTIFICATE STATE CHANGE NOTIFICATION

(75) Inventor: Paul J. Wanish, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 10/420,015

(22) Filed: Apr. 21, 2003

(65) Prior Publication Data

US 2004/0210597 A1 Oct. 21, 2004

(51) Int. Cl.
*G06F 17/30* (2006.01)
*H04L 9/00* (2006.01)

(52) U.S. Cl. .................. 707/1; 707/203; 713/170; 713/176

(58) Field of Classification Search ............... 707/1–3, 707/9, 100; 713/170, 176, 155–156
See application file for complete search history.

(56) References Cited

U.S. PATENT DOCUMENTS

| | | | |
|---|---|---|---|
| 6,044,462 A | 3/2000 | Zubeldia et al. | |
| 6,055,236 A | 4/2000 | Nessett et al. | |
| 6,112,305 A | 8/2000 | Dancs et al. | |
| 6,134,551 A | 10/2000 | Aucsmith | |
| 6,233,577 B1 | 5/2001 | Ramasubramani et al. | |
| 6,286,099 B1 | 9/2001 | Kramer | |
| 6,289,452 B1 | 9/2001 | Arnold et al. | |
| 6,301,658 B1 | 10/2001 | Koehler | |
| 6,310,966 B1 | 10/2001 | Dulude et al. | |
| 6,321,333 B1 | 11/2001 | Murray | |
| 6,324,645 B1 | 11/2001 | Andrews et al. | |
| 6,584,466 B1 * | 6/2003 | Serbinis et al. | ............... 707/10 |
| 2003/0088771 A1 * | 5/2003 | Merchen | .................... 713/175 |

OTHER PUBLICATIONS

"XML Advanced Electronic Signatures (XAdES)", ETSI Technical Specification 101 903 V1.1.1 (Feb. 2002), pp. 1-70.
A. Nash, "Certificates in the Internet: State, Issues, and Futures", PKI Technologies and Standards, RSA Security, Inc., 25 pages.
M. Myers, et al. "RFC 2560—X.509 Internet Public Key Infrastructure Online Certificate Status Protocol—OCSP", Jun., 1999, Standards Track, http://rfc-2560.rfc-list.org/rfc-2560.htm, (19 pages).

* cited by examiner

*Primary Examiner*—Alford W. Kindred
(74) *Attorney, Agent, or Firm*—Lily Neff, Esq.; Kevin P. Radigan, Esq.; Heslin Rothenberg Farley & Mesiti, P.C.

(57) ABSTRACT

A message-based approach is presented for propagating a digital certificate state change notification throughout a data processing network. The approach includes registering at least one interested party with a certificate authority for state change information relating to the digital certificate; and automatically sending a state change notification message from the certificate authority to the at least one interested party responsive to the certificate authority noting a state change in the digital certificate. The at least one interested party can be registered by the certificate authority in a subscription list with initial forwarding of the digital certificate to the certificate authority for confirmation as part of an initial authentication process. The automatically sending results in sending the state change notification to only the at least one interested party registered with the certificate authority to receive the state change information for the digital certificate at issue.

19 Claims, 3 Drawing Sheets

METHOD, SYSTEM AND COMPUTER PROGRAM PRODUCT FOR FACILITATING DIGITAL CERTIFICATE STATE CHANGE NOTIFICATION

TECHNICAL FIELD

This invention relates in general to the field of data processing, such as for electronic commerce, and more particularly, to processing for managing and providing notice of key revocation in a cryptographic environment.

BACKGROUND OF THE INVENTION

A digital certificate ("certificate") provides a degree of assurance to information (e.g., a cryptographic key) associated with a certificate. A certificate is digitally signed by the entity that offers it as a voucher for the authenticity of the information. If the certificate is issued by a trusted third party, it is assumed that this information content is valid. However, as discussed below, current techniques for determining the validity of a certificate are often inadequate.

Public key cryptography is an approach to enabling secure communications using key pairs. Each key pair includes a public key and a private key. The pubic key and private key are related so that a message encrypted by one key may be decrypted by the other, but it is computationally infeasible to deduce the private key given the public key (and conversely). The private key is typically created and securely held by an entity, while the corresponding public key is typically made widely available. Secure communications between parties may then be enabled by using the parties' public and private key pair.

Certificates have been devised to address some of the uncertainties inherent in public key cryptography. One uncertainty relates to the identity of the owner of the private key that corresponds to the public key, because the public key is widely available and subject to malicious modification. It is possible, for example, that a public key may be circulated that fraudulently purports to be the public key of party A, but the corresponding private key of which is actually held by party B.

Certificates provide a degree of assurance as to the identity of a holder of the private key corresponding to a particular public key. A certificate constitutes a certification by a certification authority ("CA") that a particular key is the public key of a particular entity, and that this entity is the holder of the corresponding private key. That is, a certificate can be used to certify the authenticity of information such as a public key.

The certificate itself is an electronic document. Although a variety of formats exist, a certificate typically includes, among other items, the name of the certification authority, the name of the certificate holder, the expiration date of the certificate, the public key of the certificate holder, and the digital signature of the certification authority. The certificate constitutes a certification by the certification authority that the holder of the certificate is the owner of the public key specified in the certificate, and, by implication, is therefore the holder of the corresponding private key.

A certificate contains the dates during which it is operational. During its operational period, a certificate is valid unless suspended or revoked. A suspension is a temporary hold that is placed on a certificate, while a revocation means that the certificate is permanently terminated from the time of revocation forward. After its operational period, a certificate is considered to be expired. A certification authority typically records a state change for a certificate in a certificate revocation list ("CRL"). If a certificate is compromised, it must be rendered inoperable (e.g., revoked). To provide notification of certificate revocations, a CA provides a full list of certificates that have been revoked in the CRL. The CRL is typically issued on a periodic basis, which can be as frequently as daily. It is necessary to consult at least the last CRL that has been issued by the CA during the validity period of a certificate to determine whether a certificate obtained from the CA was revoked prior to its expiration. Obviously, periodic distribution of a CRL can introduce delay into the notification process. Also, the number of certificates issued by a CA will affect the size of a CRL.

The strength of a conclusion that a certificate is valid is dependent, for example, on whether the set of CRLs provided to the interested party is complete and the thoroughness of the individual or program that performs the review of these lists. Retaining lists of revoked certificates (CRLs) is a non-linear cost, while the number of certificates of interest may not change. Simply, if a company has 1,000 employees, there can only be 1,000 revoked certificates of interest. But if there is a national registry, it is conventionally the obligation of the company to get all revoked certificates for the nation, which itself may be orders of magnitude larger than the employee set. The currently used process is thus often inefficient, computationally expensive, and prone to error. A need therefore exists in the art for an enhanced facility for disseminating notifications of digital signature state changes.

SUMMARY OF THE INVENTION

According to one aspect, the present invention comprises a method of providing notice of a digital certificate state change. This method includes: registering at least one interested party with a certificate authority for state change information relating to the digital certificate; and automatically sending a state change notification message from the certificate authority to the at least one interested party responsive to the certificate authority noting a state change in the digital certificate.

In certain enhanced aspects, the present invention includes recording by the certificate authority an identification of each interested party in a subscription list for use in forwarding the state change notification message responsive to detection of the state change in the digital certificate. Further, the registering with the certificate authority can be responsive to the at least one interested party initially forwarding the digital signature to the certificate authority for confirmation as part of an authentication process. In accordance with the present invention, only the at least one interested party registered with the certificate authority need receive the state change notification message. Further, when the state change comprises a revocation of the digital certificate, the revocation is propagated to the at least one interested party through the state change notification message without requiring replication of a certificate revocation list maintained by the certificate authority.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
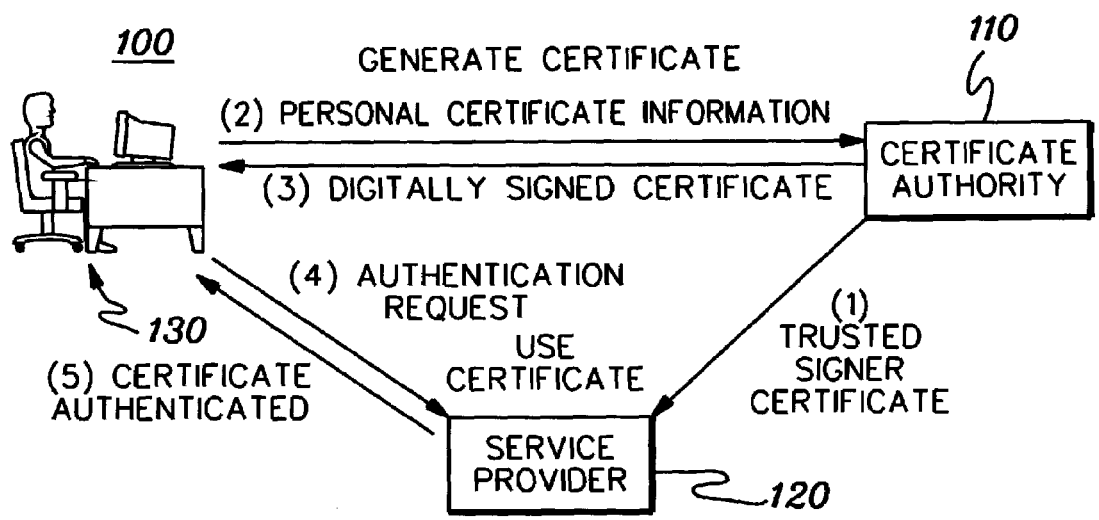
FIG. 1 is a diagram of conventional processing for obtaining and using a digital certificate in a data processing network.

FIG. 1 depicts one embodiment of a data processing network, generally denoted 100, employing conventional processing for obtaining and using a digital certificate. Data processing network 100 includes a certificate authority 110, a service provider 120 and a certificate user 130. As noted above, a digital certificate (or "certificate") constitutes, for example, a certification by a certification authority that a particular public key is the public key of a particular entity, and that this entity is the holder of the corresponding private key. That is, a certificate can be used to certify the authenticity of information such as a public key. The degree of assurance provided by a certificate depends upon a number of factors, including the reputation of the certificate authority issuing the certificate, the thoroughness of the procedures used by the certification authority in issuing the certificate, and the degree of confidence in the certificate authority's public key. Some certification authorities issue different levels of certificates, corresponding to different levels of investigation performed by the certification authority during evaluation of an application.

FIG. 1 depicts one embodiment of generation and use of a digital certificate. The certificate authority 110 provides service provider 120 with a trusted signer certificate (1), which will allow the service provider to authenticate a subsequent request from a certificate user 130. Personal certificate information (2) is generated by the certificate user and forwarded to the certificate authority 110. For example, the certificate user 130 may calculate a public and private key pair, and forward the public key to the certificate authority 110. Certificate authority 110 returns a digitally signed certificate (3) to certificate user 130. Certificate user 130 can then (or at some later time) forward the digitally signed certificate with an authentication request (4) to service provider 120. Service provider 120 accepts the request, i.e. authenticates the request (5) using the trusted signer certificate received from the certificate authority 110.

If a certificate is compromised in some manner, it must be rendered inoperable (e.g. revoked). To provide notification of certificate revocations, a certificate authority conventionally provides a list of certificates that have been revoked in a certificate revocation list. A certificate revocation list (CRL) is issued to all service providers on a periodic basis. It is necessary for a service provider to consult each and every CRL that has been issued by the certificate authority during the validity period of the certificate, i.e., to determine whether a certificate obtained from the certificate authority was revoked prior to its expiration. Depending upon the frequency of issuance of the CRLs, the rate of receiving and retaining the revocation lists introduces significant overhead, and likely delay, into the notification process.

Figure 2:
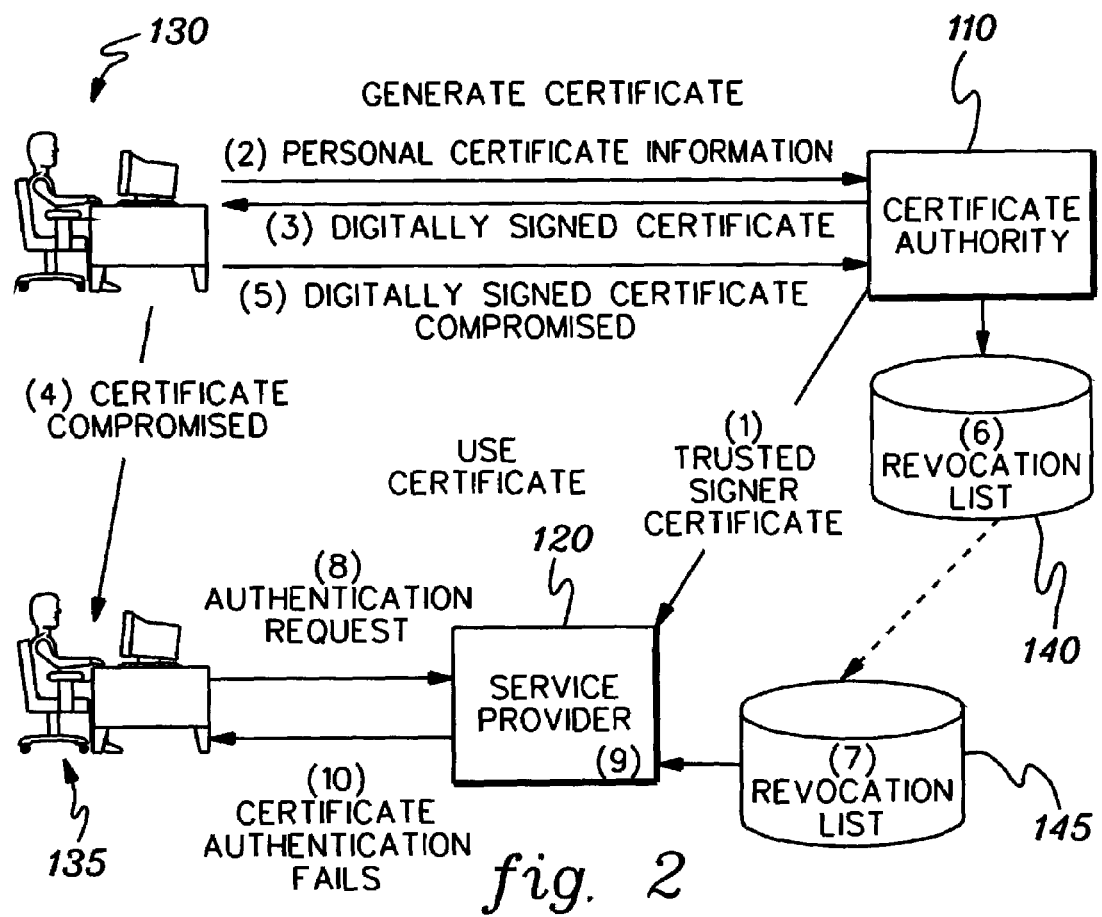
FIG. 2 is a diagram of conventional processing for disseminating digital certificate revocations using a certificate revocation list replicated across the data processing network, as well as showing conventional processing using this data responsive to receipt of a revoked certificate.

FIG. 2 depicts one embodiment of conventional processing for disseminating digital certificate revocation information using certificate revocation lists replicated within the data processing network. The data processing network again includes certificate authority 110, service provider 120 and certificate user 130. The forwarding of the trusted certificate (1), forwarding personal certificate information (2) and issuance of digitally signed certificate (3) processes are identical to the corresponding processes described above in connection with FIG. 1. In this case, however, an assumption is made that the certificate is compromised (4). For example, the computer employed by the certificate user 130 may have been misappropriated by an unauthorized user 135.

Upon detection of the misappropriation, certificate user 130 (or an authority representing certificate user 130) forwards a notice to certificate authority 110 that the digitally signed certificate has been comprised (5). Certificate authority 110 responds to this notice by recording a revocation indication in a certificate revocation list (6) (or CRL) 140. Periodically, CRL 140 is replicated throughout the data processing network so that service provider 120 eventually receives an updated copy of the revocation list (7) 145. At some point later in time, an authentication request accompanied by the compromised digitally signed certificate (8) is forwarded from unauthorized user 135 to service provider 120. Service provider 120 determines that the request is valid using the trusted signer certificate, and then checks one or more certificate revocation lists 145 to determine whether the certificate remains valid (9). As noted, an assumption is made that the updated certificate revocation list 140 has previously been replicated to service provider 120, thereby allowing the service provider to locate the revocation of the certificate. Because of the revocation, the service provider fails the certificate authentication request (10) and denies the requested information to the unauthorized user 135.

Note that if the service provider finds a certificate in one of the CRLs, it is possible to determine the status of the certificate at the time that CRL was replicated from the certificate authority. If, however, the certificate is not included in one of the CRLs consulted by the service provider, the soundness of the conclusion that the certificate is valid rests on whether any CRL or any entry in a CRL that identifies the certificate was overlooked during the process. It is possible that notification of revocation of the certificate is contained in a missing (or not yet received) CRL. Further, the task can be tedious and prone to error. Therefore, even if the set of CRLs is complete, it is possible to overlook an entry in one of the CRLs that references the certificate in question.

To address the above-noted deficiencies of the existing art, the present invention discloses a protocol which enables interested parties, both human and machine, to be automatically notified when a digital certificate of interest has undergone a state change. This messaging approach significantly reduces intermediary repositories of information, as well as providing timely state change notification, even after a certificate has been validated. In accordance with the present invention, the state of a digital certificate is associated with a set of interested parties for that certificate. If the state of the certificate changes, the interested parties are notified of the change automatically. An interested party can then track the status of the state of the digital certificate, providing the (potentially necessary) real time feedback. Additionally, the present invention provides an ability to associate charges with the use of digital certificates, instead of the current techniques of charging at the time a certificate is signed by the signing authority. The present invention limits the processing of digital certificates used for authentication to insuring that the certificate is valid, and has been digitally signed by a recognized authority. This validation is sufficient to proceed, because the present invention associates the currency of the certificate with the authorization to any other system service.

Since authentication often results in authorization to a system or service that will be repeated, it is desirable to minimize the checking of a certificate for revocation. In general, the present invention addresses this in one aspect by establishing a relationship between an authentication system and the creator of the certificate (i.e., the certificate authority or registration authority). After a digital certificate is accepted for initial connection, authorization for facilities and services occurs. During this processing, it is common practice to retain information about the user of the service. This collection of information is commonly referred to as a user profile, though different environments use different names. The present invention extends the profile information with the digital certificate credentials. Since a digital certificate can be properly signed, but no longer valid, it is necessary to check the currency of the credential at least once. The present invention extends the first check of the credential by establishing a persistent relationship between the certificate authority and the interested party (i.e. the system providing the service). As part of the initialization of the profile, the currency of the certificate is checked with the certificate authority, and as part of this, a channel is defined, such that the certificate authority may automatically communicate and notify any change in status to the service provider, thus providing a technique for the service provider to be notified of a certificate state change (e.g., when a certificate is revoked). In accordance with the present invention, a business relationship is established between the certificate authority and the service provider. This relationship enables a vehicle for financial transactions to occur that are outside of the current scope of paying for the issuance of the certificate. It also provides an interface that requires minimal technology, which makes the invention advantageous for appliances to assure the currency of certificates without requiring significant additional databases.

As a more particular example, in one conventional process, an entity presents a digital certificate that has been digitally signed by a recognized signing authority as part of establishing a secure channel of communications. This process is currently in wide use through a technique known as Secured Socket Layer (SSL) of the Hyper Text Transport Protocol (HTTP). While SSL is often used to protect (and encrypt) data that flows between systems, the specification includes the exchange of credentials. One form of these credentials is a digital certificate. Currently, the digital certificate credential is validated, based on MAC codes, RSA asymmetric key encryption and a list of known certificate authorities. After the information is validated for timeliness, consistency and accuracy, it is necessary to insure currency. At this point, a messaging technique such as presented herein is particularly advantageous. Again, in accordance with certain aspects of the current invention, the service provider requiring the currency check and the certificate authority have established a relationship wherein the certificate authority automatically provides notification of a state change of a credential, for example, when the certificate is revoked. The service provider, which retains a profile for certificate users, updates the profile for any subsequent access, and potentially takes immediate action, such as terminating any ongoing session that is active using the credentials.

In one implementation, the certificate authority can provide a Secure Socket Layer protocol that has accessed from the service provider. This permits the certificate authority to establish the identity of the requesting system, which is useful for logging, auditing and billing. It is anticipated that retaining a list of servers that are interested in the currency of credentials, is a viable service. This channel could also be employed to communicate the status of a credential. Because the channel is already encrypted, and the identity of both parties assured, any data transmitted can be logged for future legal purposes, without having to be individually signed. This can be a performance improvement, particularly if sufficient or frequent checks are made. SSL/HTTPS protocols can be used for information transport, but a persistent messaging product could alternatively be used to provide notification. Several products exist to enable this, including MQSeries and TIBCO/Talarian Guaranteed Message Services offered by International Business Machines Corporation. While it is possible to convey the status of a change in a certificate over the messaging channel, this might not provide the confidentiality of the information necessary. By only providing core information, such as the name on the certificate authority and the serial number of the credential in question, no sensitive information is exposed. While the invention has significant focus on certificate revocation, the state change notification can propagate other state changes than simply revocation. The present invention permits any state change to be identified and notice of the state change to be forwarded to interested parties. Examples might include suspension or resumption of a certificate. Also, a certificate could be digitally signed again by a certificate authority, or a new certificate with additional information generated. The interface is also sufficient to notify the subscribing service of the change or regeneration of a certificate that represents the same entity.

Figure 3:
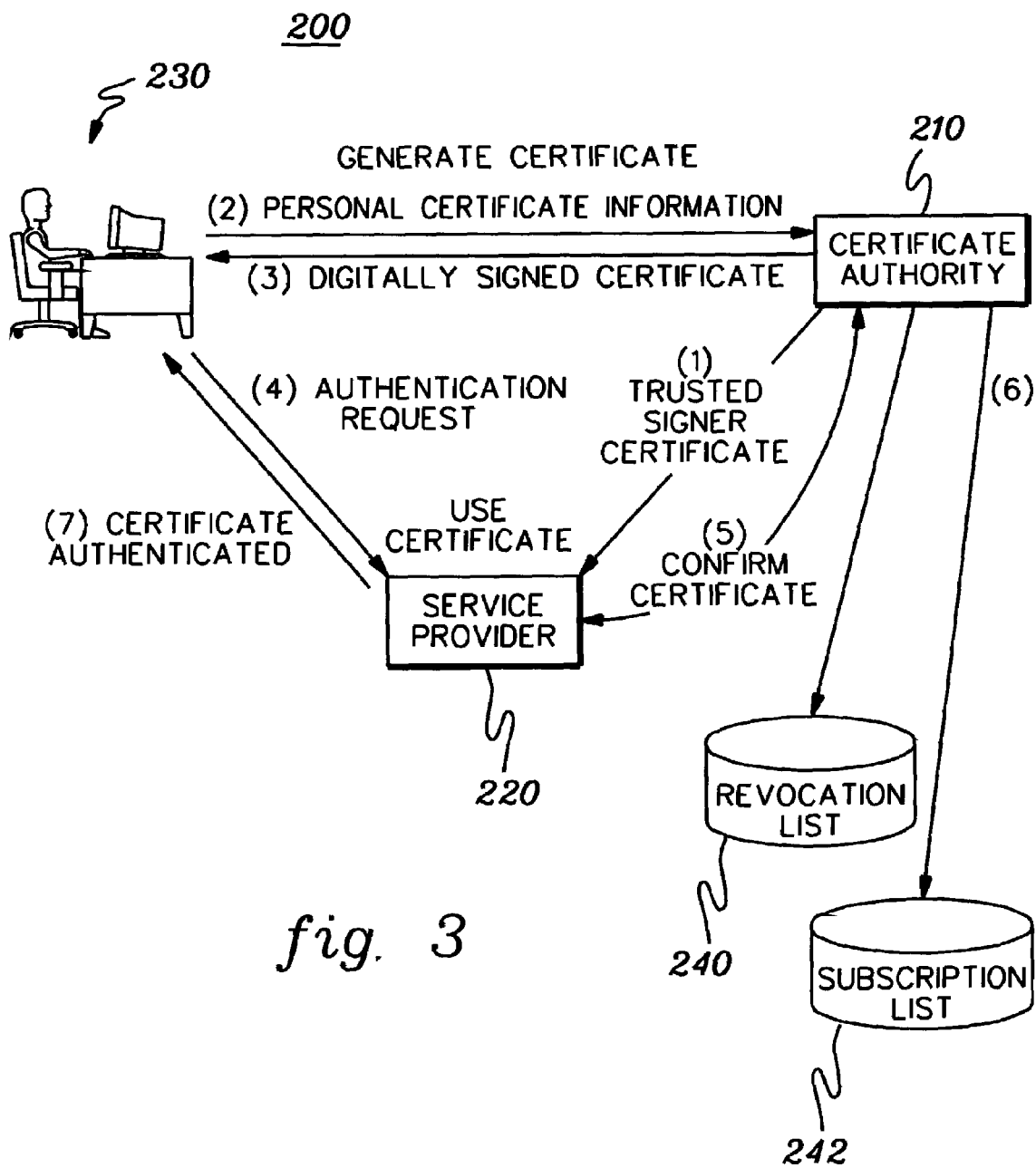
FIG. 3 depicts one example of a notification facility for registering an interested party with a certificate authority for use in propagating a future digital certificate state change message, in accordance with an aspect of the present invention.

FIG. 3 depicts one example of a process for providing notice of a digital certificate state change in accordance with an aspect of the present invention. A data processing network 200 includes a certificate authority 210, a service provider 220 and a certificate user 230. Steps (1) through (4) would be identical to those described above in connection with FIG. 1. Specifically, certificate authority 210 provides a trusted signer certificate (1) to service provider 220, and a certificate user generates personal certificate information (2), which is used by the certificate authority to create a digitally signed certificate (3) that is returned to the certificate user 230. The certificate user attaches the digitally signed certificate to an authentication request (4) forwarded to service provider 220.

At this point, service provider 220, if this is the first request from the certificate user 230 employing the digitally signed certificate, sends the certificate to the certification authority to verify that the certificate is valid (5). Commensurate with validating the certificate, certificate authority 210 registers service provider 220 as an interested party for the digital certificate to receive future notification of a state change (6). This interested party information is recorded in a subscription list 242 maintained by the certificate authority 210. Subscription list 242 is separate from a conventional certificate revocation list 240, which contains a list of revoked certificates. Thus, the service provider only confirms a digital certificate once with the certificate authority 210, and thereafter the certificate authority 210 knows to notify service provider 220, as an interested party, whenever there is a change in status to the digital certificate at issue. Essentially, service provider 220 becomes a subscriber for notification from the certificate authority (210) of a digital certificate state change. By implementing this process, the certificate authority need not replicate the certificate revocation list across the data processing network, but rather simply send state change messages to interested parties when appropriate. The certificate authority, in essence, becomes a publisher to the subscribing interested parties when there is a relevant digital certificate state change.

At the service provider, the profile information by the service provider can be readily expanded to include, for example, a flag to indicate whether the certificate authority has forwarded a state change notification regarding the corresponding digital certificate. Assuming that the certificate remains valid, the certificate is authenticated by the service provider (7) and the certificate user 230 is allowed the requested information or access.

Figure 4:
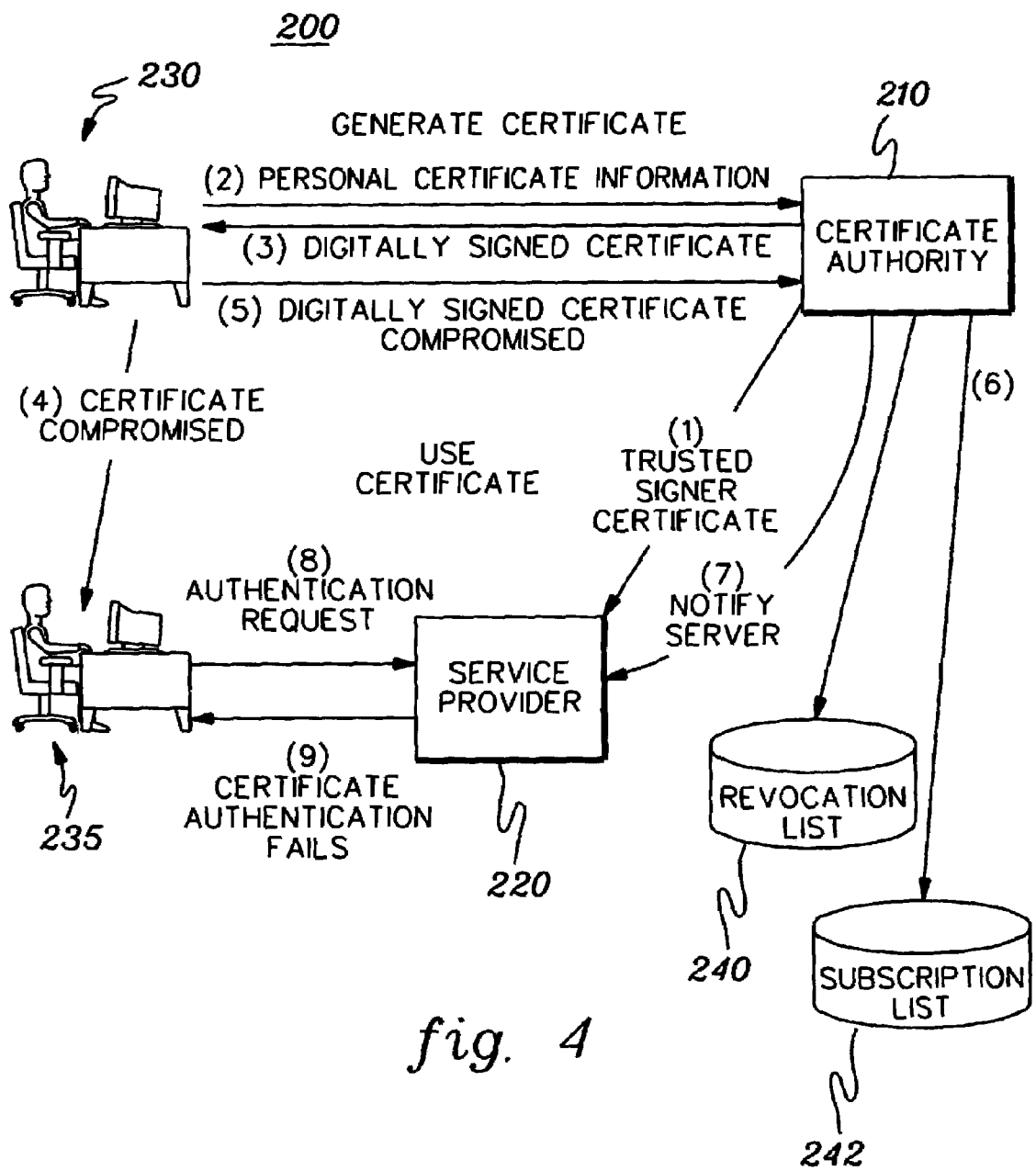
FIG. 4 depicts one embodiment of a process for propagating revocation of a digital certificate within a data processing network employing the subscription list of FIG. 3, in accordance with an aspect of the present invention.

FIG. 4 depicts one example of a process for establishing revocation of a digital certificate within data processing network 200 in accordance with an aspect of the present invention. In this example, steps (1) through (3) are identical to those described above in connection with FIG. 3. However, in this case, the digitally signed certificate is compromised (4) by an unauthorized user 235. Notice of the comprise is forwarded to the certificate authority (5), which updates the certificate revocation list 240 and accesses the subscription list (6) 242 to obtain names of interested parties to be notified of the state change. Certificate authority 210 then automatically sends a message to the interested parties to notify them of the state change (7). So, before the unauthorized user attempts an authentication request (8) using the compromised digitally signed certificate, the service provider will have already received information that the digital certificate has been revoked. The service provider retains this notification with the profile for the certificate user. This profile information can be accessed when the compromised digital certificate is forwarded with the authentication request (8) by the unauthorized user 235. Service provider 220 thus fails the certificate authentication request (9) and denies access by the unauthorized user.

The computing unit functionality presented herein in accordance with aspects of the present invention can be readily implemented by those skilled in the art based upon the discussion provided herein. Advantageously, the present invention discloses a protocol which enables interested parties, both human and machine, to be automatically notified when a digital certificate of interest has undergone a state change. This state change can comprise any type of change, including revocation of the certificate. The messaging approach presented significantly reduces intermediary repositories of information and provides a timely state change notification mechanism.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of providing notice of a digital certificate state change, said method comprising:

registering at least one interested party with a certificate authority for state change information relating to the digital certificate, the registering including recording by the certificate authority an identification of each interested party in a subscription list for use in forwarding the state change notification message responsive to detection of the state change in the digital certificate;

automatically sending a state change notification message from the certificate authority to the at least one interested party responsive to the certificate authority noting a state change in the digital certificate; and wherein the registering occurs prior to the certificate authority notification of the state change in the digital certificate.

2. The method of claim 1, wherein the registering is responsive to the at least one interested party initially forwarding the digital certificate to the certificate authority for confirmation as part of an initial authentication process.

3. The method of claim 1, wherein the at least one interested party comprises at least one service provider.

4. The method of claim 1, wherein the automatically sending comprises automatically sending the state change notification to only the at least one interested party registered with the certificate authority to receive the state change notification message.

5. The method of claim 1, wherein the state change comprises a revocation of the digital certificate, and wherein the revocation is propagated to the at least one interested party through the state change notification message without requiring replication of a certificate revocation list maintained by the certificate authority.

6. The method of claim 1, further comprising storing at the at least one interested party state change information relating to the digital certificate, and subsequently, employing by the at least one interested party the stored state change information for the digital certificate responsive to an authentication request received from a certificate user.

7. A computer-implemented system for providing notice of a digital certificate state change, said system comprising:

means for registering at least one interested party with a certificate authority for state change information relating to the digital certificate, the means for registering comprising means for recording by the certificate authority an identification of each interested party in a subscription list for use in forwarding the state change notification message responsive to detection of the state change in the digital certificate;

means for automatically sending a state change notification message from the certificate authority to the at least interested party responsive to the certificate authority noting a state change in the digital certificate; and wherein the means for registering occurs prior to the certificate authority notification of the state change in the digital certificate.

8. The system of claim 7, wherein the means for registering is responsive to the at least one interested party initially forwarding the digital certificate to the certificate authority for confirmation as part of an initial authentication process.

9. The system of claim 7, wherein the at least one interested party comprises at least one service provider.

10. The system of claim 7, wherein the means for automatically sending comprises means for automatically sending the state change notification to only the at least one interested party registered with the certificate authority to receive the state change notification message.

11. The system of claim 7, wherein the state change comprises a revocation of the digital certificate, and wherein the revocation is propagated to the at least one interested party through the state change notification message without requiring replication of a certificate revocation list maintained by the certificate authority.

12. The system of claim 7, further comprising means for storing at the at least one interested party state change information relating to the digital certificate, and subsequently, for employing by the at least one interested party the stored state change information for the digital certificate responsive to an authentication request received from a certificate user.

13. A computer-implemented system for providing notice of a digital certificate state change, said system comprising:

a computing unit at a certificate authority for registering at least one interested party for state change information relating to the digital certificate, the registering including recording by the certificate authority an identification of each interested party in a subscription list for use in forwarding the state change notification message responsive to detection of the state change in the digital certificate;

wherein the computing unit automatically sends a state change notification message from the certificate authority to the at least one interested party responsive to the certificate authority noting a state change in the digital certificate; and wherein the registering occurs prior to the certificate authority notification of the state change in the digital certificate.

14. At least one program storage device readable by a machine, tangibly embodying at least one program of instructions executable by the machine to perform a method of providing notice of a digital certificate state change, said method comprising:

registering at least one interested party with a certificate authority for state change information relating to the digital certificate, the registering including recording by the certificate authority an identification of each interested party in a subscription list for use in-forwarding the state change notification message responsive to detection of the state change in the digital certificate;

automatically sending a state change notification message from the certificate authority to the at least one interested party responsive to the certificate authority noting a state change in the digital certificate; and wherein the registering occurs prior to the certificate authority notification of the state change in the digital certificate.

15. The at least one program storage device of claim 14, wherein the registering is responsive to the at least one interested party initially forwarding the digital certificate to the certificate authority for confirmation as part of an initial authentication process.

16. The at least one program storage device of claim 14, wherein the at least one interested party comprises at least one service provider.

17. The at least one program storage device of claim 14, wherein the automatically sending comprises automatically sending the state change notification to only the at least one interested party registered with the certificate authority to receive the state change notification message.

18. The at least one program storage device of claim 14, wherein the state change comprises a revocation of the digital certificate, and wherein the revocation is propagated to the at least one interested party through the state change notification message without requiring replication of a certificate revocation list maintained by the certificate authority.

19. The at least one program storage device of claim 14, further comprising storing at the at least one interested party state change information relating to the digital certificate, and subsequently, employing by the at least one interested party the stored state change information for the digital certificate responsive to an authentication request received from a certificate user.

* * * * *